340-870.12 SR

OR 3,541,538

Nov. 3,541,538

MULTIPLEX TELEMETRY SYSTEM

Filed June 21, 1967

INVENTORS
G. A. SHUTE
W. R. McCARTHY
BY Harry A. Herbert Jr
ATTORNEY
James S. Shannon
AGENT United States Patent Office 3,541,538

Patented Nov. 17, 1970

3,541,538

MULTIPLEX TELEMETRY SYSTEM

George A. Shute, 102 Del Mar Hills, Laredo, Tex. 78040, and William R. McCarthy, 1540 W. Constance Drive, Minneapolis, Minn. 55422

Filed June 21, 1967, Ser. No. 648,543
Int. Cl. G08c *15/04*
U.S. Cl. 340—184 5 Claims

ABSTRACT OF THE DISCLOSURE

A multiplex radio telemetry system in which each subcarrier transmits two channels of information. At the transmitter, the information to be sent over one of the two channels is converted to a frequency analog and that to be sent over the other to a direct current analog, which analogs are added and the sum impressed as a frequency modulation on the subcarrier. At the receiver, the subcarrier is demodulated to recover the sum signal. To recover the information represented by the direct current analog the sum signal is applied to a device that measures its average value, and to recover the information represented by the frequency analog the alternating component of the sum signal is separated and applied to a discriminator.

The invention described herein may be manufactured and used by or for the United States Government for governmental purposes without the payment to us of any royalty thereon.

BACKGROUND OF THE INVENTION

The invention relates to radio multiplex telemetry systems of the type in which a plurality of information channels are created by the use of subcarriers of different frequencies which modulate the carrier frequency of the transmitter. Normally in such systems each subcarrier provides for only a single information channel.

SUMMARY OF THE INVENTION

The invention increases the information handling ability of a multiplex system of the above type by providing two information channels for each subcarrier, one channel transmitting its information as a direct current analog and the other transmitting its information as a frequency analog, the sum of the two analogs modulating the subcarrier. At the receiver, each subcarrier is demodulated to recover the sum of the two analogs. The information in one channel is then recovered by measuring the average value of the sum signal, and the information in the other channel is recovered by separating the alternating component from the sum signal and applying it to a discriminator having an output proportional to frequency.

BRIEF DESCRIPTION OF THE DRAWING

Referring to FIG. 1, the transmitter station of the telemetry system shown has eight inputs, designated 1A, 1B, . . . , 4A, 4B, which are to be displayed on correspondingly numbered indicating instruments remotely located at the receiving station. These inputs may be of any kind that can be converted to a direct current analog or to a frequency analog. Examples are temperatures, pressures, mechanical stresses, displacements, rates, etc.

Figures 1, 2, 3, 4:
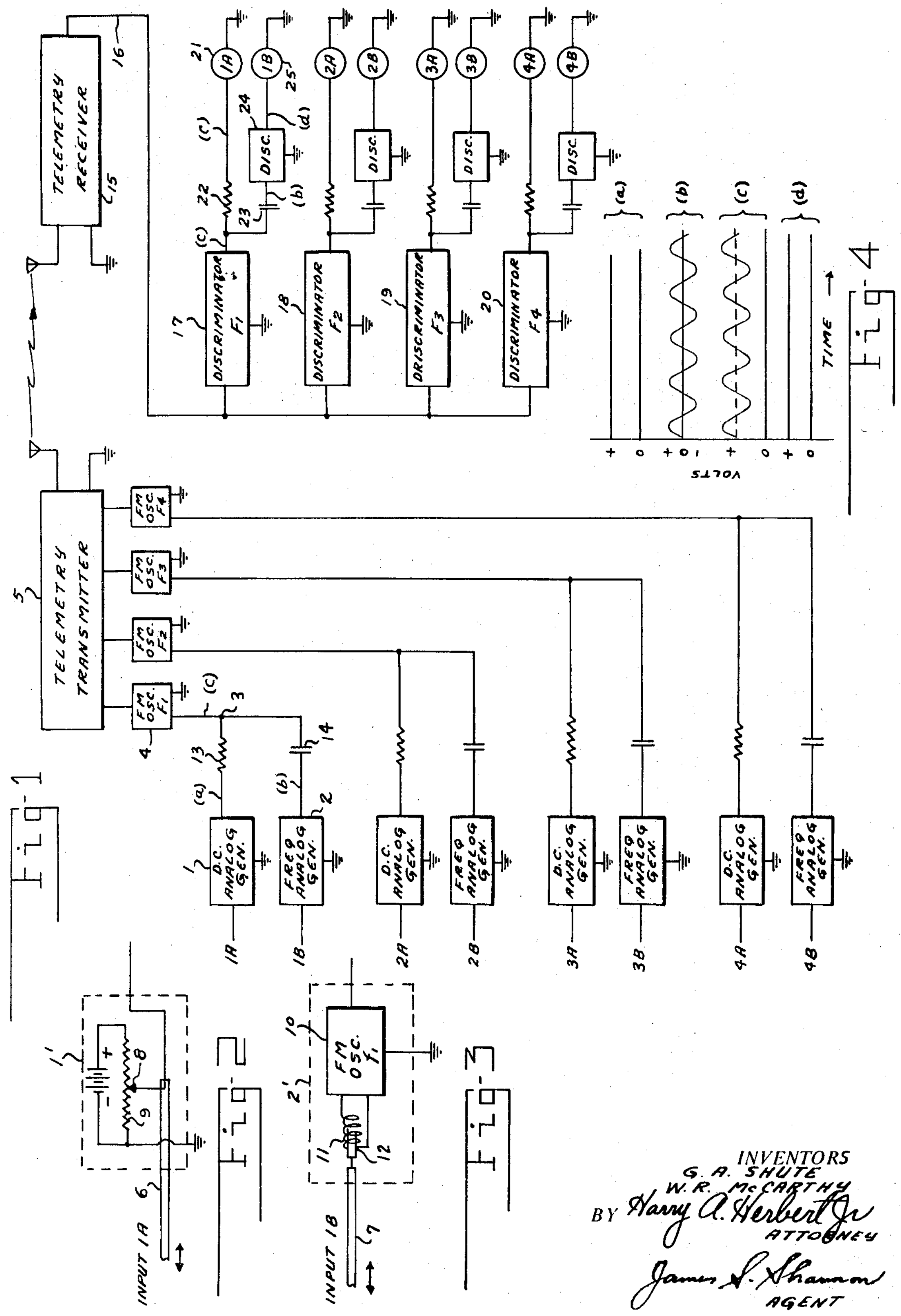
FIG. 1 is a block diagram of a telemetry system embodying the invention.
FIGS. 2 and 3 are schematic illustrations of suitable direct current and frequency analog generators for use in FIG. 1.
FIG. 4 shows waveforms appearing in the system of FIG. 1.

Input 1A is applied to direct current analog generator 1 which produces a direct voltage output, represented by waveform (a) of FIG. 4, the magnitude of which is representative of input 1A. The input 1B is applied to frequency analog generator 2 which produces an alternating voltage output, represented by waveform (b) of FIG. 4, the frequency of which is representative of this input. The outputs of generators 1 and 2 are added at points 3 and the resultant sum, represented by waveform (c) of FIG. 4, is applied as a modulating signal to subcarrier oscillator 4. In the system shown, this oscillator is of the frequency modulated type and the sum signal frequency modulates the subcarrier wave of frequency $F_1$ produced by this oscillator. The frequency modulated subcarrier is then applied to the telemetry transmitter 5 where it modulates the transmitter carrier in a conventional manner. The remaining three subcarrier channels ($F_2$, $F_3$ and $F_4$) are identical to the one just described.

The design of analog generators 1 and 2 depends upon the nature of the inputs. FIGS. 2 and 3 show suitable designs for inputs that are, or can be reduced to, longitudinal displacements of a rod 6 or 7. The block 1′ of FIG. 2 may be substituted for block 1 of FIG. 1, and block 2′ of FIG. 3 may be substituted for block 2 of FIG. 1. The analog generator of FIG. 2 may be designed so that contact 8 is at the left hand end of resistor 9, producing zero output voltage, when input 1A is zero, and at the right hand end, producing a maximum positive voltage, when this input is at its maximum, giving an output such as illustrated at (a) in FIG. 4. The analog generator of FIG. 3 contains an oscillator 10 the frequency of which depends upon the value of inductance 11 which in turn depends upon the position of core 12 attached to rod 7. At one limit of the longitudinal movement of rod 7 the frequency has its minimum value and at the other end its maximum value. The center frequency of this range of variation may be designated $f_1$. The output is represented by waveform (b) of FIG. 4. Resistor 13 (FIG. 1) isolates analog generator 2 from generator 1 and prevents its output from being short circuited when contact 8 is at ground potential. Similarly, capacitor 14 isolates the direct current output of generator 1 from generator 2.

The signal radiated by transmitter 5 is received at a remote point by telemetry receiver 15 which also demodulates the receive signal producing in its output 16 the four frequency modulated subcarriers $F_1$, $F_2$, $F_3$, $F_4$. This output is applied in parallel to four discriminators 17, 18, 19 and 20, all identical except for their center frequencies which correspond to the four subcarrier frequencies. The discriminators demodulate the receiver subcarrier output to reproduce the four modulating waveforms applied to the FM oscillators at the transmitter and represented at (c) in FIG. 4.

Considering discriminator 17, it is apparent that the average value of its output, represented by the dotted line in waveform (c), is proportional to the input 1A at the transmitting end of the system. This average value may be indicated by simply applying the output of the discriminator to a direct current meter 21, through a current limiting resistor 22 if necessary. If the median frequency $f_1$ of the alternating component of this output is sufficiently high, the natural integration of the direct current meter will normally result in a steady indication of the average value. Otherwise an integrating device such as a shunt capacitor (not shown) may be employed. It is also apparent that the alternating component of the output of discriminator 17 corresponds to the output of frequency analog generator 2 at the transmitter, represented by waveform (b). Therefore, the frequency of this component is proportional to the input 1B at the transmitter.

An indication of this input can therefore be obtained by producing a direct voltage proportional to the frequency of this component and applying it to a direct current instrument. To accomplish this the direct current component of the output of discriminator 17 is removed by capacitor 23 and the remaining alternating current component applied to discriminator which has a center frequency corresponding to the center frequency of the output of analog generator 2 at the transmitter. The output of discriminator 24 is a direct voltage, represented by waveform (d) of FIG. 4, that is proportional to the frequency of wave (b) and therefore to input 1B at the transmitter. This output is applied to direct current meter 25 which therefore indicates the magnitude of the 1B input. Similar indicating circuits are coupled to the outputs of remaining discriminators 18, 19 and 20.

We claim:

1. A multiplex telemetry system comprising: a radio transmitter and a cooperating radio receiver; a plurality of modulatable subcarrier generators coupled to said transmitter for modulating its radiated energy with modulated subcarrier waves of different frequencies; associated with each subcarrier generator, a direct current analog generator for producing at its output a direct current analog of an applied input, a frequency analog generator for producing at its output an alternating signal the frequency of which is an analog of an applied input, means for adding the outputs of said analog generators, and means for applying the sum as a modulating signal to the associated subcarrier generator; a plurality of demodulators, corresponding in number to said subcarrier generators, coupled in parallel to the output of said receiver, whereby the ouptut of each demodulator is a replica of the modulating signal applied to the corresponding subcarrier generator; and, associated with each demodulator, a pair of direct current meters, means for applying the output of the demodulator to one of said meters to indicate its average value, a discriminator, means for removing the direct current component from the output of the demodulator and for applying the remaining alternating current component to said discriminator for producing a direct current output proportional to the frequency of said alternating current component, and means for applying the output of said discriminator to the other of said meters for indicating its magnitude.

2. Apparatus as claimed in claim 1 in which said subcarrier generators are frequency modulatable oscillators, and in which said demodulators are discriminators.

3. In a multiplex telemetry system of the type having a plurality of subcarrier channels each with a subcarrier modulator at its input end and a subcarrier demodulator at its output end, apparatus for imposing two telemetry channels on each subcarrier channel, said apparatus comprising: means at the sending end of each subcarrier channel for converting the data for one telemetry channel into an analog of one type and means for converting the data for the other telemetry channel into an analog of a different type, and means for applying the two analogs simultaneously to said subcarrier modulator for impressing them on the subcarrier by a modulation thereof that is of the same type for each analog; and a pair of indicator circuits coupled to the output of said demodulator, each indicator circuit being sensitive to a different one of said analog types and insensitive to the other.

4. Apparatus as claimed in claim 4 in which the two analog types are direct current analog and frequency analog and in which the subcarrier modulatiton is frequency modulation.

5. Apparatus as claimed in claim 4 in which one of said indicator circuits is a circuit having an output proportional to the average value of the demodulator output and the other indicator circuit is a circuit that is a function of the frequency of the demodulator output.

References Cited

UNITED STATES PATENTS

| | | | |
|---|---|---|---|
| 2,668,283 | 2/1954 | Mullin | 340—184 X |
| 3,032,717 | 5/1962 | Fowler et al. | 179—15 X |

DONALD J. YUSKO, Primary Examiner

C. M. MARMELSTEIN, Assistant Examiner

U.S. Cl. X.R.

179—15